US011128213B2

(12) United States Patent
Sakabe et al.

(10) Patent No.: US 11,128,213 B2
(45) Date of Patent: Sep. 21, 2021

(54) INVERTER CIRCUIT AND X-RAY RADIATION DEVICE

(71) Applicants: Fujikin Incorporated, Osaka (JP); T & S Corporation, Noda (JP)

(72) Inventors: Toshiro Sakabe, Osaka (JP); Toyohiko Aoki, Noda (JP); Kiyomi Watanabe, Noda (JP); Shin Yokoshima, Noda (JP)

(73) Assignees: T & S CORPORATION, Chiba (JP); FUJIKIN INCORPORATED, Osaka (JP)

(*) Notice: Subject to any disclaimer, the term of this patent is extended or adjusted under 35 U.S.C. 154(b) by 320 days.

(21) Appl. No.: 16/204,237

(22) Filed: Nov. 29, 2018

(65) Prior Publication Data

US 2019/0165668 A1    May 30, 2019

(30) Foreign Application Priority Data

Nov. 30, 2017  (JP) .............................. JP2017-229973

(51) Int. Cl.
| | |
|---|---|
| H02H 3/00 | (2006.01) |
| H02M 1/32 | (2007.01) |
| H05G 1/54 | (2006.01) |
| H05G 1/10 | (2006.01) |
| H02M 1/08 | (2006.01) |
| H02M 7/5387 | (2007.01) |

(Continued)

(52) U.S. Cl.
CPC .............. *H02M 1/32* (2013.01); *H02M 1/08* (2013.01); *H02M 7/5395* (2013.01); *H02M 7/53871* (2013.01); *H05G 1/10* (2013.01); *H05G 1/54* (2013.01); *H02M 1/0009* (2021.05); *H02M 1/0025* (2021.05); *H02M 1/325* (2021.05)

(58) Field of Classification Search
CPC . H02M 1/08; H02M 1/32; H05G 1/10; H05G 1/26
USPC ............................................................ 361/87
See application file for complete search history.

(56) References Cited

U.S. PATENT DOCUMENTS 6,111,732 A * 8/2000 Beland ............... H05B 41/2851
361/42
9,468,081 B2 * 10/2016 Seo ......................... G05F 1/455
(Continued)

FOREIGN PATENT DOCUMENTS

| JP | 2002-354659 A | 12/2002 |
|---|---|---|
| JP | 2003-324956 A | 11/2003 |

*Primary Examiner* — Jared Fureman
*Assistant Examiner* — Lucy M Thomas
(74) *Attorney, Agent, or Firm* — W&C IP

(57) ABSTRACT

An inverter circuit of an embodiment includes a plurality of semiconductor switching elements constituting a bridge circuit; a transformer connected to the output end of the bridge circuit; an electric current detector that detects whether an electric current carried through at least one of the switching elements exceeds a predetermined value; a pulse generator circuit that transmits a periodic pulse signal; a flip-flop circuit connected to the detector and the pulse generator circuit; a field effect transistor (FET) turned on or off by a signal from the flip-flop circuit; and a gate signal generator circuit connected to the FET and the bridge circuit. The flip-flop circuit inverts an output signal by a detection signal of the detector and interrupts the output of the bridge circuit. The gate signal generator circuit switches the switching element at the diagonal position of the bridge circuit based on a signal from the FET.

12 Claims, 5 Drawing Sheets

(51) Int. Cl.
*H02M 7/5395* (2006.01)
*H02M 1/00* (2006.01)

(56) References Cited

U.S. PATENT DOCUMENTS

| | | | | |
|---|---|---|---|---|
| 2001/0054881 A1* | 12/2001 | Watanabe | ......... | H02M 3/33576 |
| | | | | 320/166 |
| 2011/0133546 A1* | 6/2011 | Jang | .................. | H02M 7/53871 |
| | | | | 307/9.1 |
| 2012/0281444 A1* | 11/2012 | Dent | ......................... | H02J 7/35 |
| | | | | 363/56.01 |
| 2013/0049599 A1* | 2/2013 | Logiudice | .............. | H05B 45/37 |
| | | | | 315/122 |
| 2013/0243161 A1* | 9/2013 | Hishikawa | .............. | H01J 35/10 |
| | | | | 378/93 |

* cited by examiner

INVERTER CIRCUIT AND X-RAY RADIATION DEVICE

BACKGROUND

Technical Field

The present invention relates to an inverter circuit and an X-ray radiation device using the same.

Related Art

In power supply circuits that apply high voltages to a load device, such as an X-ray tube, there is known a method using an inverter circuit that generates an alternating current from a direct current power supply.

JP 2003-324956 A, for example, discloses a series resonance bridge inverter circuit in which semiconductor switches are formed in a full bridge circuit across a direct current voltage source and a resonance inductance, a resonance capacitor, and a load circuit are connected to the alternating current output side of the full bridge circuit.

FIG. 5 shows a circuit block diagram of a direct-current-to-direct-current converter 100 disclosed in JP 2003-324956 A. The DC-DC converter 100 includes a direct current power supply 101, a voltage type bridge inverter 102, a control circuit 117, a transformer 107, and a bridge rectifier circuit 114. The bridge rectifier circuit 114 is connected to a load device 16.

The voltage type bridge inverter 102 includes four insulated-gate bipolar transistors (IGBTs) 103A, 103B, 103C, and 103D. To the IGBTs 103A to 103D, diodes 104A to 104D are respectively connected in parallel. The IGBTs 103A and 103B are connected in series and the IGBTs 103C and 103D are connected in series in these orders. The series connection of the IGBTs 103A and 103B and the series connection of the IGBTs 103C and 103D are connected in parallel with the direct current power supply 101.

The transformer 107 boosts a voltage from the voltage type bridge inverter 102, and outputs the voltage to the bridge rectifier circuit 114. The primary wire of the transformer 107 is connected to the voltage type bridge inverter 102, and the secondary wire is connected to the bridge rectifier circuit 114.

The bridge rectifier circuit 114 full-wave-rectifies and smooths the alternating voltage from the secondary wire of the transformer 107. The smoothed direct current voltage is applied to the load device 16.

The control circuit 117 is a circuit that periodically outputs pulse signals and feed backs the voltage outputted to the load device 16 to the operation of the IGBTs 103A to 103D. The signals from the control circuit 117 are supplied to the IGBTs through signal insulating circuits 118A, 118B, 118C, and 118D. The set of the IGBTs 103A and 103D and the set of the IGBTs 103B and 103C are alternately turned on for a certain time and off for time for which these two sets are off (a so-called dead time) by the pulse signals from the control circuit 117.

However, a flow of an overcurrent into the IGBT due to an electric current emitted from an inductance-capacitance (LC) component in the circuit or discharge from the load device 16 may damage the IGBTs and the neighboring electric circuits. Specifically, when an X-ray tube is used as the load device 16, an overcurrent occurs due to discharge from the X-ray tube. Therefore, there is a need for an inverter circuit that can protect IGBTs from an overcurrent by detecting the occurrence of the overcurrent.

JP 2002-354659 A discloses an overcurrent protection device having an overcurrent detecting unit, a latch circuit, and any other component. The overcurrent detecting unit detects an overcurrent carried through a switching element formed of an IGBT, and the latch circuit latches an overcurrent detection signal outputted from the overcurrent detecting unit. The device includes a unit that periodically releases the latch of the latch circuit. This overcurrent protection device has a flip-flop circuit between an overcurrent detection circuit and a bridge circuit that constitutes an inverter. However, since an operational amplifier is provided between the electric current detection circuit and the flip-flop circuit, the start of protection of the IGBT is delayed after the detection of an overcurrent. In this circuit, after an overcurrent is detected, the inverter temporarily stops, and hence the circuit fails to periodically protect the IGBT described later.

To the output end of the control circuit of this overcurrent protection device, AND circuits that constitute a gate circuit are connected. Supposing that a photocoupler is mounted on the subsequent stage of an AND element, there is need for a circuit that reliably provides an electric current enough to drive the photocoupler, resulting in an increase in the number of components and a complicated circuit. A general-purpose pulse width modulation (PWM) integrated circuit (IC) provides an output current enough to switch the photocoupler, and the direct use of the output current of the IC is desired in order to downscale the circuit.

SUMMARY

An object of the present invention is to provide an inverter circuit that quickly protects a semiconductor switching element from an overcurrent upon detection of the occurrence of the overcurrent.

An object of the present invention is to perform periodic protection that can provide high-speed protection in synchronization with the operation period of an inverter as the protection of an IGBT under PWM control against an overcurrent and that can provide automatic return also in synchronization with the operation period of the inverter when the overcurrent is eliminated.

Specifically, in PWM control, the IGBT is periodically turned on for ON-time specified by PWM control. For example, at 20 kHz, the IGBT is turned on for 18 microseconds. However, in periodic protection, the electric current of the IGBT is increased during the ON period. When the overcurrent level is reached in ten microseconds, for example, the IGBT is turned off even in the midway point of the ON-time specified in PWM control, and this OFF-state is maintained to ON-timing in the subsequent period. When the overcurrent state is not returned to the normal state even though ON-timing in the subsequent period is started, the IGBT is again turned off in the midway point of the ON-time specified in PWM control, and the OFF-state is similarly maintained to ON-timing in the subsequent period. After the overcurrent state is eliminated, when ON-timing in the subsequent period is started, the IGBT is turned on for 18 microseconds in ON-time specified in PWM control for automatic return.

In the periodic protection, the inverter is not stopped even though an overcurrent is detected, and the operation is continued while the IGBT is protected from the overcurrent. When the overcurrent is eliminated, the operation can be returned to the original state. For example, it is sometimes inconvenient to stop the inverter every time when micro discharge is generated from the X-ray power supply. It is convenient to continue the operation during the micro discharge while the IGBT is protected from the overcurrent. In the case in which the overcurrent state is continued for a long time, the X-ray power supply may be turned off using a low-speed overcurrent protection circuit using an operational amplifier, for example, separately provided.

To achieve the above object, an inverter circuit according to an aspect of the present invention includes: a plurality of semiconductor switching elements constituting a bridge circuit; a transformer connected to an output end of the bridge circuit; an electric current detector configured to detect whether an electric current carried through at least one of the plurality of semiconductor switching elements exceeds a predetermined value; a pulse generator circuit configured to transmit a periodic pulse signal; a flip-flop circuit connected to the electric current detector and the pulse generator circuit, the flip-flop circuit being configured to invert an output signal by a detection signal of the electric current detector to interrupt an output of the bridge circuit; an electric current bypass switch in which a signal from an output terminal of the flip-flop circuit controls turning on or off the electric current bypass switch; and a gate signal generator circuit connected to the electric current bypass switch and the bridge circuit, the gate signal generator circuit being configured to switch the semiconductor switching element at a diagonal position of the bridge circuit based on a signal from the pulse generator circuit.

Furthermore, the gate signal generator circuit may have a plurality of photocouplers, and it may be determined whether to supply an electric current necessary to turn on a semiconductor switching element to light emitting diodes of the photocouplers based on a signal from the electric current detector.

Furthermore, the gate signal generator circuit may control an operation of the plurality of semiconductor switching elements based on an operation of the photocouplers.

Furthermore, the photocouplers may be connected to the electric current bypass switch in parallel.

Furthermore, the pulse generator circuit may be composed of a switching regulator integrated circuit.

Furthermore, the photocouplers may include four photocouplers, and two photocouplers may be each connected in series.

The flip-flop circuit may be a reset-set (RS) flip-flop circuit having an S-side input terminal connected to the electric current detector and an R-side input terminal connected to the pulse generator circuit, and when the electric current detector detects an electric current exceeding a predetermined value, the output terminal of the flip-flop circuit turns on the electric current bypass switch, bypasses an electric current to the gate signal generator circuit by the electric current bypass switch, stops a signal output to the gate signal generator circuit, and latches the plurality of semiconductor switching elements to be turned off.

Furthermore, the pulse generator circuit may be connected to the electric current bypass switch, and the pulse generator circuit may have a transistor between a connection end to the electric current bypass switch and a reference potential part.

Furthermore, the flip-flop circuit may be reset by a voltage from a control power supply, the voltage being applied to a collector of the transistor when the transistor is off.

Furthermore, the inverter circuit may further include: a rectifier configured to rectify a voltage of a secondary wire of the transformer; an output voltage detection circuit configured to detect an output voltage of the rectifier; and an error amplifier configured to compare the output voltage with a predetermined reference voltage to output a compared result, wherein the pulse generator circuit may be modulated based on an output signal from the error amplifier.

Furthermore, the electric current detector may detect an electric current carried across the transformer and the semiconductor switching element.

An X-ray radiation device according to another aspect of the present invention is an X-ray radiation device including an inverter circuit having a transformer, and an X-ray tube connected to secondary wire of the transformer, wherein the inverter circuit is any one inverter circuit described above.

According to an aspect of the present invention, in the inverter circuit, upon detection of the occurrence of an overcurrent, a semiconductor switching element can be quickly protected from the overcurrent.

DETAILED DESCRIPTION

Inverter Circuit

In the following, an embodiment of an inverter circuit according to an exemplary embodiment of the present invention will be described with reference to the drawings.

Figure 1:
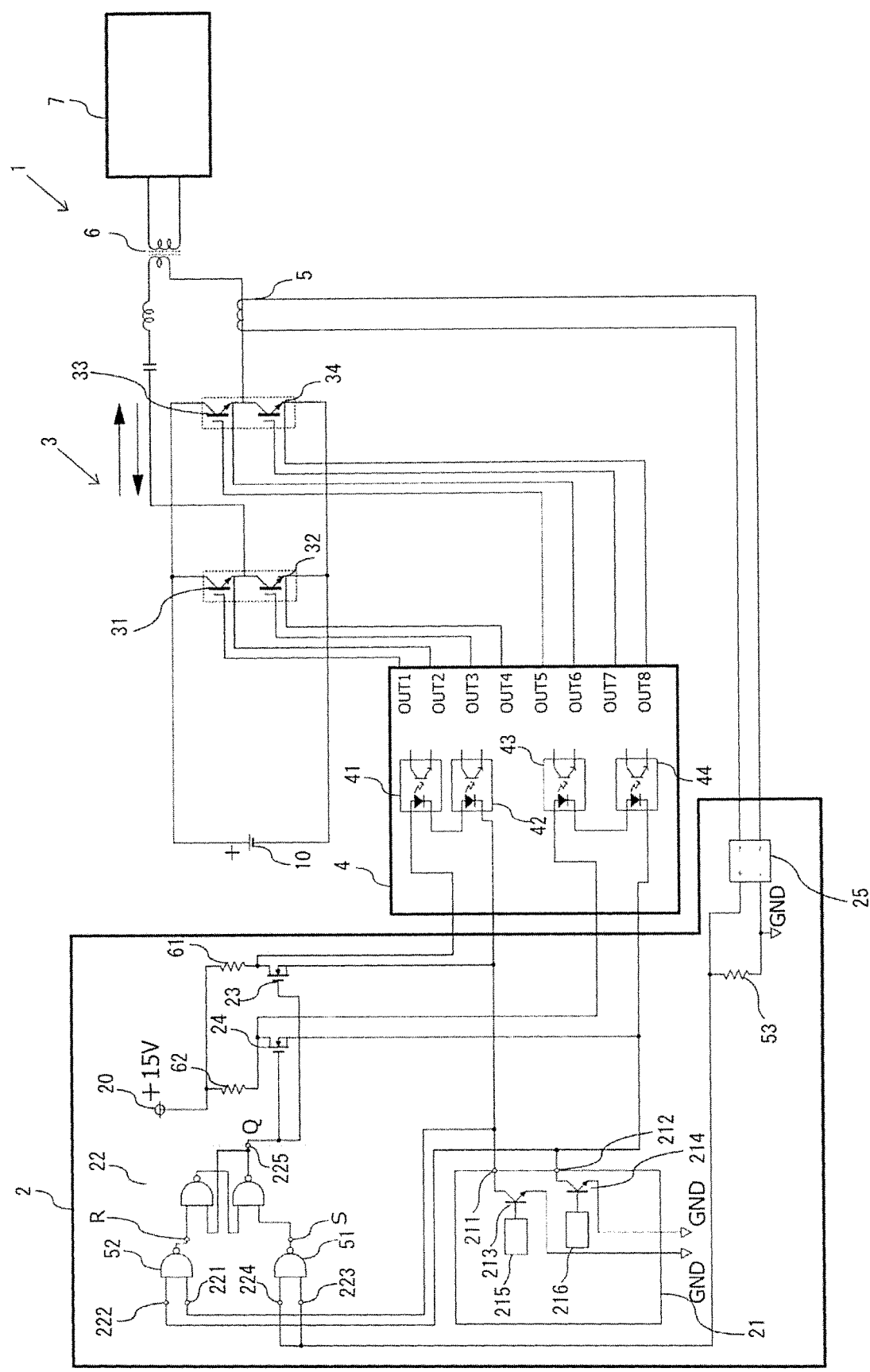
FIG. 1 is a circuit block diagram of an embodiment of an inverter circuit according to an exemplary embodiment of the present invention.

As shown in FIG. 1, the inverter circuit 1 includes a control circuit 2, a bridge inverter 3, a direct current power supply 10, a gate signal generator circuit 4, an electric current detector 5, and a transformer 6. The inverter circuit 1 generates an alternating voltage from the direct current power supply 10 in order to apply a high voltage to a load device 7 connected through the secondary wire of the transformer 6.

Control Circuit 2

The control circuit 2 has a pulse generator circuit 21, an error amplifier 26, a flip-flop circuit 22, a first field effect transistor (FET) 23 that is an example of an electric current bypass switch, a second FET 24 that is an example of an electric current bypass switch, and a rectifier 25.

Figure 2:
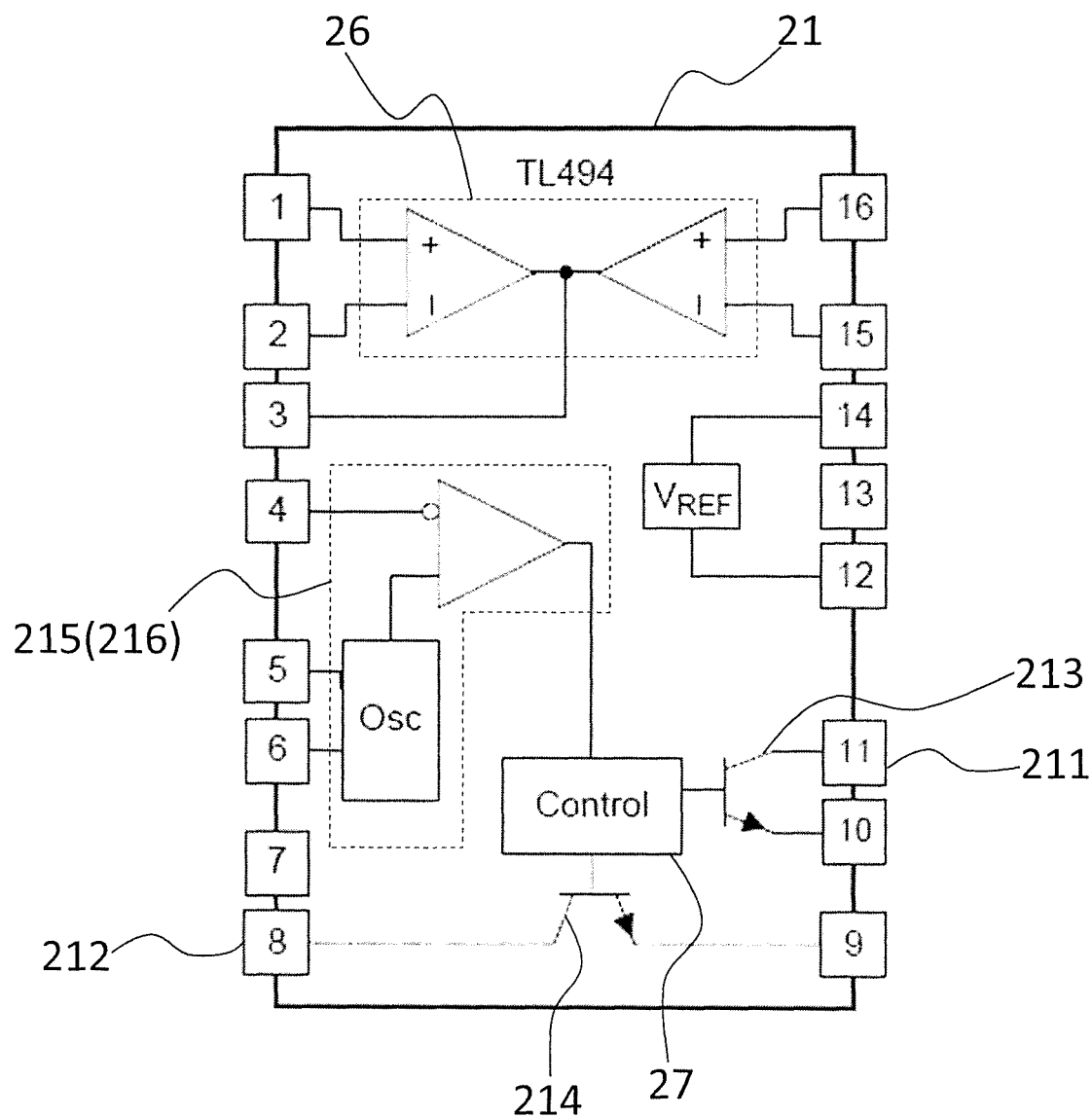
FIG. 2 is a schematic block diagram of an IC constituting a pulse generator circuit included in the inverter circuit.

The pulse generator circuit 21 is a circuit that generates pulse signals repeating periodic turning on and off and transmits the signals to the flip-flop circuit 22. As shown in FIG. 2, the pulse generator circuit 21 is composed of one IC together with the error amplifier 26 and transistors 213 and 214, described later. This IC is a general-purpose PWM IC that is a commercially available IC named as a PWM controller IC or a switching regulator controller IC. The IC is TL 494 (produced by Texas Instruments Inc.), for example. The IC may be a second source product having a configuration and functions equivalent to TL 494.

As shown in FIG. 1, the pulse generator circuit 21 includes two pulse generating elements 215 and 216 that alternately transmit ON signals. The frequency of the pulse signal generated at the pulse generator circuit 21 is approximately 20 kHz, for example. The voltage supplied to the load device 7 is under PWM control by the pulse generator circuit 21. Note that as shown in FIG. 2, a configuration may be provided in which the pulse generating elements 215 and 216 are combined by one component combines and a control element 27 is connected to the subsequent stage of the component such that ON signals are alternately transmitted to two output parts.

To the output side of the pulse generating element 215, the base of the transistor 213 is connected. Upon turning on the transistor 213 by the output signal of the pulse generating element 215, an electric current necessary to turn on IGBTs 31 and 34 are carried through a photocoupler electric current limiting resistor 61 and the light emitting diodes of photocouplers 41 and 42. After the output signal of the pulse generating element 215 is stopped and the transistor 213 is turned off, a connection end 211 of the pulse generator circuit 21 to the outside is turned into a pullup state, no electric current is carried, and the IGBTs 31 and 34 are turned off.

To the output side of the pulse generating element 216, the base of the transistor 214 is connected. Upon turning on the transistor 214 by the output signal of the pulse generating element 216, an electric current necessary to turn on IGBTs 32 and 33 is carried through a photocoupler electric current limiting resistor 62 and the light emitting diodes of the photocouplers 43 and 44. After the output signal of the pulse generating element 216 is stopped and the transistor 214 is turned off, a connection end 212 of the pulse generator circuit 21 to the outside is turned into a pullup state, no electric current is carried, and the IGBTs 32 and 33 are turned off.

As described above, the IC of the pulse generator circuit 21 has the transistors 213 and 214 on the output parts, and hence the pulse generator circuit 21 enables the absorption of an electric current enough to switch the photocouplers.

The connection ends 211 and 212 are respectively directly connected to the collectors of the transistors 213 and 214. The emitter terminals of the transistors 213 and 214 are connected to a reference potential part.

When the pulse generating element 215 is on, the transistor 213 is turned on, and then the emitter and the collector of the transistor 213 are turned into the state in which an electric current can be carried. When the pulse generating element 215 is off, the transistor 213 is turned off. Similarly, when the pulse generating element 216 is on, the transistor 214 is turned on, and then the emitter and the collector of the transistor 214 are turned into the state in which an electric current can be carried. When the pulse generating element 216 is off, the transistor 214 is turned off.

Note that in the embodiment, the transistors 213 and 214 are bipolar transistors, and may be FETs.

The error amplifier 26 is a component that is applied with a detection voltage generated by dividing a voltage applied to the load device 7 and with a predetermined reference voltage and compares the detection voltage with the reference voltage. The detection voltage is generated by an output voltage detection circuit, not shown, detecting the output voltage of a rectifier that rectifies the voltage of the secondary wire of the transformer 6. The error amplifier 26 compares the applied detection voltage with the applied reference voltage, and outputs a signal based on the compared result. The pulse generator circuit 21 modulates the pulse duration based on the output signal from the error amplifier 26, and generates a PWM signal.

The flip-flop circuit 22 is a reset-set (RS) flip-flop including a Q-output terminal 225. To the input terminal on the rest side (in the following, referred to as "R-side"), a NAND gate 52 is connected. To the input terminal on the set side (in the following, referred to as "S-side"), a NAND gate 51 is connected. The NAND gate 52 has input terminals 221 and 222. The NAND gate 51 has input terminals 223 and 224. The R-side input terminal is connected to the connection ends 211 and 212 of the pulse generator circuit through the dead time detection NAND gate 52. The S-side input terminal is connected to the rectifier 25 through the overcurrent determination NAND gate 51, and connected to the electric current detector 5 through the rectifier 25. The output terminal 225 is connected to the gate terminals of the first and the second FETs 23 and 24.

The drains of the first and the second FETs 23 and 24 are connected to a constant voltage source 20 respectively through the resistors. The voltage of the constant voltage source 20 is 15 V, for example.

The sources of the FETs 23 and 24 are respectively connected to the collectors of the transistors 213 and 214 included in the pulse generator circuit 21. In other words, the pulse generator circuit 21 has the transistor 213 between the connection end 211 to the FET 23 and the transistor 214 between the connection end 212 to the FET 24 and the reference potential part. When an electric current is carried across the drain and the source of the FET 23 and across the drain and the source of the FET 24, the electric current from the constant voltage source 20 can be carried into the reference potential part through the transistors 213 and 214.

The drains and the sources of the FETs 23 and 24 are also connected to the anodes and the cathodes of the light emitting diodes of the photocouplers included in the gate signal generator circuit 4. The configuration will be described later.

Bridge Inverter 3 and Direct Current Power Supply 10

The bridge inverter 3 includes four IGBTs 31, 32, 33, and 34 that are examples of a plurality of semiconductor switching elements. These four IGBTs 31 to 34 constitute a full bridge circuit. That is, the IGBTs 31 and 32 are connected in series, and the IGBTs 33 and 34 connected in series in these orders. The series connection of the IGBTs 31 and 32 and the series connection of the IGBTs 33 and 34 are in parallel with each other.

The direct current power supply 10 is a power supply that supplies a direct current voltage across the collector and the emitter of each of the four IGBTs 31 to 34. The direct current power supply 10 is configured in which a commercial 200-volt alternating power supply, for example, is rectified. The bridge inverter 3 may be a full bridge circuit or a half bridge circuit.

Gate Signal Generator Circuit 4

The gate signal generator circuit 4 is a circuit that is switchable whether to carry an electric current across the collector and the emitter of the individual IGBTs 31 to 34 based on the output signal of the pulse generator circuit 21 and the output signal of the flip-flop circuit 22.

The gate signal generator circuit 4 has the first photocoupler 41, the second photocoupler 42, the third photocoupler 43, and the fourth photocoupler 44. That is, the photocouplers 41 to 44 and the IGBTs 31 to 34 are disposed in the same numbers. The photocouplers 41 to 44 are each formed of a light emitting diode and a light receiving device that receives light from the light emitting diode and outputs a signal. The four photocouplers 41 to 44 are configured to operate so as to respond to the operations of the four IGBTs 31 to 34.

The photocouplers 41, 42, 43, and 44 serve to electrically insulate the control circuit 2 from the inverter 3 using their insulation. For example, the direct current power supply is a direct current power supply obtained by rectifying a 200-volt alternating current. Grounding the power supply causes a ground fault on a 200-volt alternating current line. On the other hand, the control circuit 2 controls the voltage, for example, of the X-ray tube, and operates with reference to a safe ground potential. When the voltage of this X-ray tube is detected and the unchanged voltage is brought into the control circuit 2, this causes a ground fault on the 200-volt alternating current line. The photocouplers 41, 42, 43, and 44 transmit ON signals with the control circuit 2 insulated from the inverter 3.

The light emitting diodes of the first and the second photocouplers 41 and 42 are connected in series. The light emitting diodes of the third and the fourth photocouplers 43 and 44 are connected in series.

Between the drain and the source of the first FET 23, the light emitting diodes of the first and the second photocouplers 41 and 42 connected in series are connected. Between the drain and the source of the second FET 24, the light emitting diodes of the third and the fourth photocouplers 43 and 44 connected in series are connected. The photocouplers 41 and 42 connected in series are connected in series to the transistor 213 of the pulse generator circuit 21. The photocouplers 43 and 44 connected in series are connected in series to the transistor 214.

The four IGBTs 31 to 34 are configured so as to operate depending on the operation of the four photocouplers 41 to 44. Specifically, two diodes connected in series correspond to the operation of two IGBTs diagonally disposed. That is, the photocouplers 41 and 42 control the IGBTs 31 and 34, and the photocouplers 43 and 44 control the IGBTs 32 and 33. Although the IGBTs 31 and 34 operate at the same timing, the IGBTs 31 and 34 have different emitter voltages. Thus, the two photocouplers 41 and 42 are disposed in series, and driven simultaneously. In FIG. 1, the arrangement order of the photocouplers 41 to 44 is not matched with the arrangement order of output terminals OUT1 to OUT8 of the gate signal generator circuit 4.

Upon detection of an overcurrent, when the flip-flop circuit 22 is set and the output end Q of the flip-flop circuit 22 is turned to "1" (in the positive logic, "1" corresponds to a high voltage, and "0" corresponds a low voltage), the first FET 23 is turned on, and no electric current necessary to turn on the IGBTs 31 and 34 is carried through the first and the second photocouplers 41 and 42. Similarly, when the second FET 24 is turned on, no electric current necessary to turn on the IGBTs 32 and 33 is carried through the third and the fourth photocouplers 43 and 44.

As described above, electric currents carried through the light emitting diodes of the first to the fourth photocouplers 41 to 44 depend on the output of the output end Q of the flip-flop circuit 22, and also depend on the operation of the pulse generator circuit 21. When the output of the output end Q of the flip-flop circuit 22 is "1", the gate signal generator circuit 4 switches whether to carry an electric current across the collectors and the emitters of the IGBTs 31 to 34 depending on the output signal of the pulse generator circuit 21. When an electric current enough to drive the transistor in the photocoupler is not carried through the light emitting diodes of the first to the fourth photocouplers 41 to 44, the IGBTs 31 to 34 do not operate regardless of the output signal of the pulse generator circuit 21.

In the configuration of the embodiment, two photocouplers are connected in series, and two photocouplers connected in series are connected to one FET in parallel. However, a configuration may be provided in which four photocouplers are individually connected to FETs in parallel. In this configuration, the total number of FETs between the flip-flop circuit 22 and the gate signal generator circuit 4 is four in the control circuit 2.

In accordance with the inverter circuit 1 according to the embodiment of the present invention, the collectors of the output transistors 213 and 214 connected to the pulse generating elements 215 and 216 are connected to the sources of the FETs 23 and 24. Therefore, the collectors of the transistors 213 and 214 are connected to the control power supply 20 through the resistors connected to the photocouplers 41 to 44 in series even when the photocouplers 41 to 44 are bypassed. That is, since the collector voltages of the transistors 213 and 214 are turned to a high level when the transistors 213 and 214 are periodically turned off, this high-level voltage can be used for resetting the flip-flop circuit 22. In the NAND gate 52, the voltages of the connection ends 211 and 212 to the outside of the pulse generator circuit 21 are turned to +15 V when both of the transistors 213 and 214 are turned off. That is, since both inputs are turned to "1" in dead time, the output of the NAND gate 52 is turned to "0", and the flip-flop circuit is reset.

In accordance with the inverter circuit 1 according to the embodiment of the present invention, no logic IC, such as the AND element, is provided between the pulse generator circuit 21 and the photocouplers 41 to 44, and the pulse generator circuit 21 is directly connected to the photocouplers 41 to 44. Therefore, the output current of the pulse generator circuit 21 is provided enough to drive the photocouplers 41 to 44. That is, according to the inverter circuit 1, an alternating voltage can be generated with a smaller number of components and a simple configuration.

Figure 3:
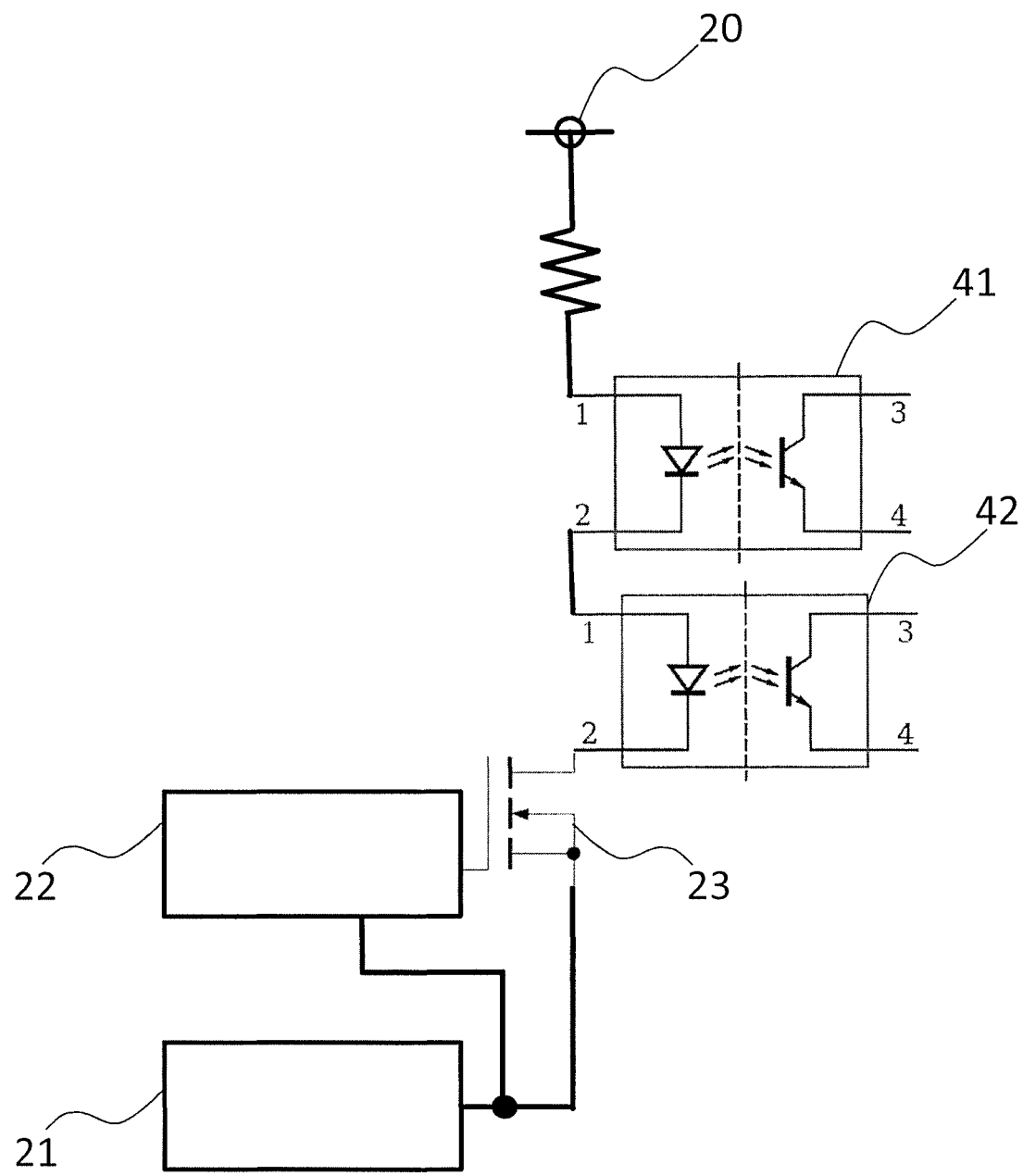
FIG. 3 is a schematic block diagram of a part of another embodiment of an inverter circuit according to an exemplary embodiment of the present invention.

Note that as shown in FIG. 3, the first FET 23 and the light emitting diodes of the photocouplers 41 and 42 may be connected to the transistor of the pulse generator circuit 21 and the flip-flop circuit 22 in series. In this case, the inversion of the output end Q of the flip-flop is used for the input to the first FET 23, and the first FET 23 is turned on in normal operation and turned off when an overcurrent is detected. The same thing is applied to the second FET 24 and the diodes of the photocouplers 43 and 44.

However, in the circuit in FIG. 3, when the first FET 23 is turned off, the source side of the first FET 23 is electrically floated. Since the potential on the source side of this first FET 23 is used for resetting the flip-flop circuit 22, there is a need for additionally providing a circuit that pulls up the potential at this part.

As shown in FIG. 3, in the case in which the first FET 23 is disposed in series to the photocouplers 41 and 42, an electric current in the same amount carried through the photocoupler is carried through the first FET 23 even in normal operation in which no overcurrent occurs. However, as shown in FIG. 1, in the case in which the first FET 23 and the photocouplers 41 and 42 are disposed in parallel with each other, no electric current is carried through the first FET 23 in normal operation, and an electric current is carried through the first FET 23 merely for time for which an overcurrent is detected and the first FET 23 is turned on (time for a PWM pulse at most, as described later). Thus, a smaller-sized FET with a small heat generation can be adopted.

Transformer 6

The transformer 6 boosts an alternating voltage generated by the bridge inverter 3, and supplies the voltage to the load device 7. One end of the primary wire of the transformer 6 is connected between the source of the IGBT 31 and the drain of the IGBT 32 through the capacitor and a coil. The other end of the primary wire is connected between the drain of the IGBT 33 and the source of the IGBT 34. The secondary wire of the transformer 6 is connected to the load device 7. The voltage on the secondary wire side of the transformer 6 ranges from approximately 40 to 150 kV, for example. However, the voltage of the transformer 6 is non-limiting. The voltage may range from approximately 200 to 400 kV, or the transformer 6 may provide higher output.

Electric Current Detector 5

The electric current detector 5 detects whether an electric current carried through the IGBTs 31 to 34 exceeds a predetermined value. The electric current detector 5 is a current transformer, for example. The electric current detector 5 measures an electric current across the primary wire of the transformer 6 and the IGBT 33 and the IGBT 34. Note that the electric current detector 5 may be configured in which a known resistor having a low resistance value and high withstand power is inserted in series and voltage across the resistor is read.

The output signal of the electric current detector 5 is an alternating current that is proportional to the electric current of the IGBT and scaled. The alternating current is carried through an electric current detecting resistor 53 through the rectifier 25 in the control circuit 2, and generates a detection voltage that is proportional to the electric current of the IGBT across the electric current detecting resistor 53. The detection voltage is connected to the short-circuited input terminals 224 and 223 of the NAND gate 51. The appropriate selection of the value of the electric current detecting resistor 53 generates a voltage of 7.5 V at the overcurrent level of the IGBT, and the output Q of the flip-flop circuit 22 is turned to "1". The rectifier 25 is a bridge diode, for example.

Load Device 7

The load device 7 is an X-ray tube, for example. The X-ray tube is connected to the inverter circuit 1 and the secondary wire of the transformer 6 included in the inverter circuit 1, and constitutes an X-ray radiation device. The inverter circuit 1 applies a high voltage across the anode and the cathode of the X-ray tube. Note that the X-ray radiation device according to the embodiment of the present invention includes desktop X-ray radiation devices and portable X-ray radiation devices.

Figure 4:
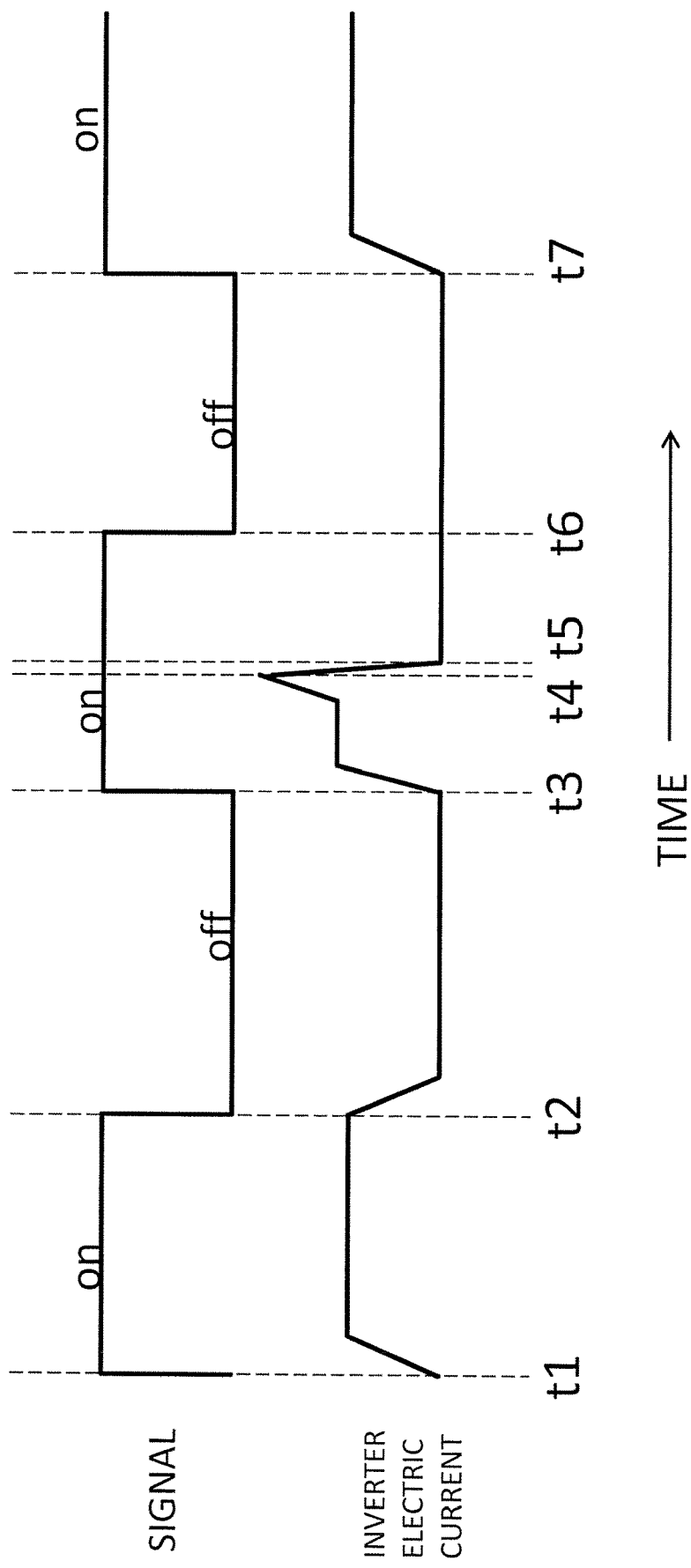
FIG. 4 is a schematic time chart showing the relationship between pulse signals outputted from a control circuit included in the inverter circuit and an electric current measured by an electric current detector included in the inverter circuit.
Figure 5:
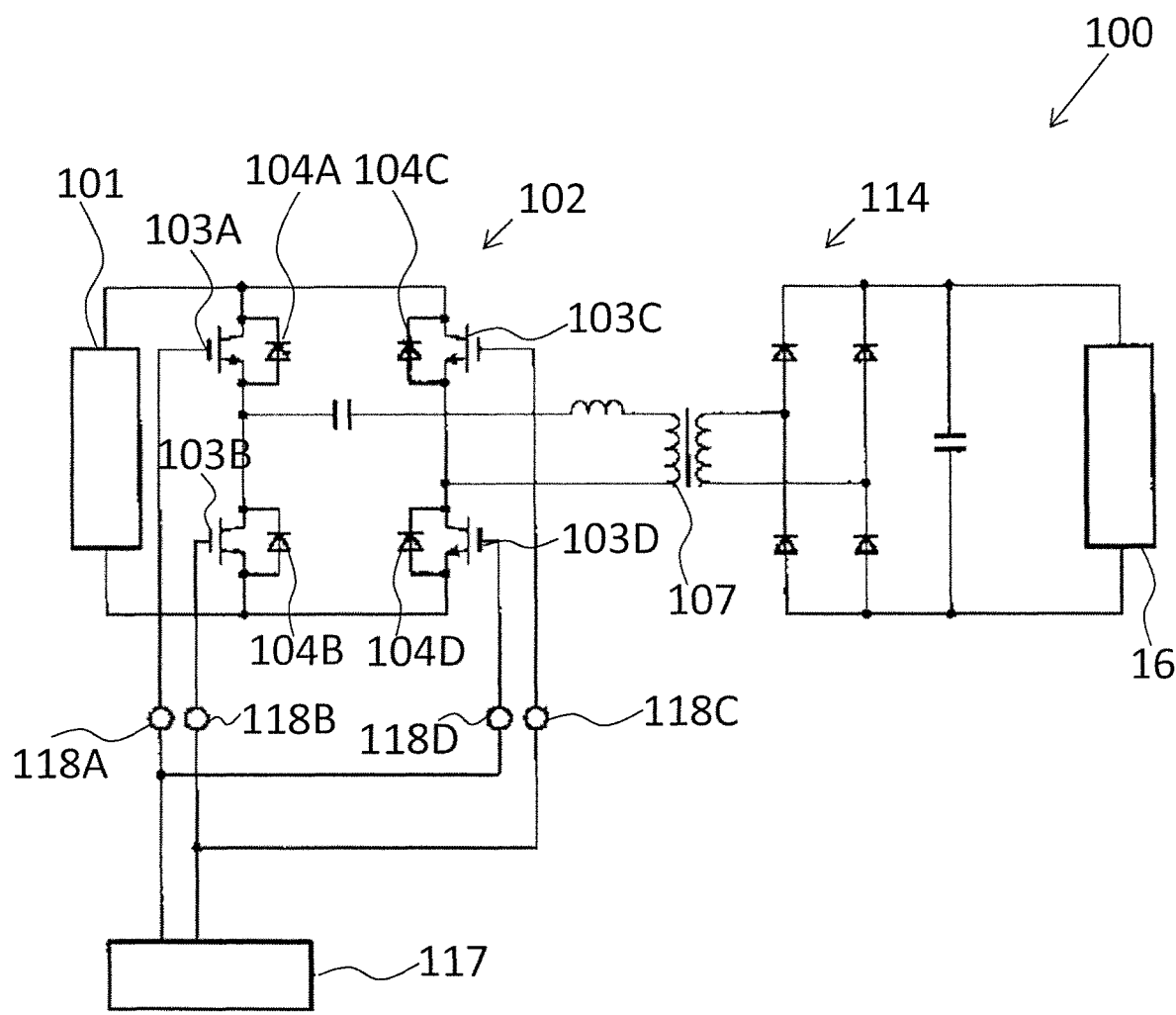
FIG. 5 is a circuit block diagram of an inverter circuit according to a related technique.

Description of the Output Signal from the Pulse Generator Circuit 21 and the Operation of the IGBT FIG. 4 shows the output signals of the pulse generating element 215 and the operation of two IGBTs diagonally disposed among the IGBTs 31 to 34. In FIG. 4, a waveform above depicts the output waveform of the pulse generating element 215, and a waveform below depicts the electric current waveform of the inverter. From time t1 to time t3, periodic changes in the output signals of the pulse generating element 215 and the inverter electric current are depicted.

At time t1, upon outputting an ON signal from the pulse generating element 215, the ON signal is inputted to the R-side input terminal of the flip-flop circuit 22. In the case in which the electric current detector 5 detects no electric current exceeding a predetermined value, i.e. the electric current detector 5 detects no overcurrent, the input signal to the S-side input terminal of the flip-flop circuit 22 is turned off. Therefore, the signal outputted from the output terminal 225 is zero, and the FETs 23 and 24 are off. Therefore, the state is turned to the state in which a voltage can be applied from the constant voltage source 20 to the light emitting diodes of the first to the fourth photocouplers 41 to 44.

At this time, the ON signal from the pulse generating element 215 turns on the transistor 213. Therefore, from the constant voltage source 20, an electric current enough to drive the transistor in the photocoupler is carried through the light emitting diodes of the photocouplers 41 and 42. The gate signal generator circuit 4 then outputs signals to the gates of the IGBTs 31 and 34. That is, the IGBTs 31 and 34 are turned on. Note that at this time, since the pulse generating element 216 that alternately operates with respect to the pulse generating element 215 is turned off, the IGBTs 32 and 33 are turned off.

As shown at t2, in the state described above, upon outputting an OFF signal from the pulse generating element 215, the OFF signal is inputted to the R-side input terminal of the flip-flop circuit 22. In the case in which the electric current detector 5 detects no overcurrent, the input signal to the S-side input terminal of the flip-flop circuit 22 is off. At this time, since the flip-flop circuit 22 is turned into the "hold" state, the signal outputted from the output terminal 225 is zero. Since the first and the second FETs 23 and 24 are off, the state is turned into the state in which a voltage can be applied to the diodes of the first to the fourth photocouplers 41 to 44. However, since the transistor 213 of the pulse generator circuit 21 is off, no electric current enough to drive the transistor in the photocoupler is carried through the light emitting diodes of the photocouplers 41 and 42, and the gate signal generator circuit 4 outputs no signal to the gates of the IGBTs 31 to 34.

At the timing at which the OFF signal is outputted from the pulse generating element 215, the ON signal is outputted from the pulse generating element 216. In the case in which the electric current detector 5 detects no overcurrent, the state is turned into the state in which a voltage can be applied from the constant voltage source 20 to the diodes of the first to the fourth photocouplers 41 to 44, similarly to the operation of the pulse generating element 215. In this case, since the transistor 214 of the pulse generating element 216 is on, an electric current enough to drive the transistor in the photocoupler is carried through the photocouplers 43 and 44 of the gate signal generator circuit 4 for light emission, and the IGBTs 32 and 33 are turned on.

In the pulse generator circuit 21, the pulse generating elements 215 and 216 are alternately repeatedly turned on and off. When the electric current detector 5 detects no overcurrent, the IGBTs 31 to 34 periodically operate in response to the periodic pulse signals from the pulse generator circuit 21 to generate the inverter electric current.

At time t3, an ON signal is again outputted from the pulse generating element 215. As shown at time t4, after the electric current detector 5 detects an overcurrent, the input signal to the S-side input terminal of the flip-flop circuit 22 is turned on, and the signal outputted from the output terminal 225 is turned to one. A voltage is applied to the gate terminals of the first and the second FETs 23 and 24, and the first and the second FETs 23 and 24 are turned on.

Consequently, the electric current from the constant voltage source 20, which is not carried to the photocouplers 41 to 44, is carried to the reference potential part through the transistors 213 and 214. At this time, the operation of the IGBTs 31 and 34 is stopped. Thus, as shown at time t5, the generation of the inverter electric current is stopped.

After no overcurrent is carried, the input to the S-side input terminal of the flip-flop circuit 22 is zero. From time t5 to time t6, the output of the pulse generating element 215 is on. However, since the flip-flop circuit 22 is in the "hold" state, the output of the output terminal 225 remains one, and the state in which the inverter electric current is stopped continues. At time t6, after the output of the pulse generating element 215 is turned off, the input to the R-side input terminal of the flip-flop circuit 22 is turned to one, and the output of the output terminal 225 is zero. That is, the state is returned to the state in normal operation. Therefore, as shown at time t7, the inverter circuit 1 again starts the generation of an alternating voltage from the point in time at which the first ON signal after no overcurrent is carried is supplied from the pulse generating element 215.

Here, the example is described in the case in which an overcurrent is detected when an ON signal is outputted from the pulse generating element 215. However, the same thing is applied when an ON signal is outputted from the pulse generating element 216.

It is expected that an overcurrent is generated by emission of energy stored in the LC component of the inverter circuit 1, or by discharge from the load device 7, for example. That is, the time for which an overcurrent is generated is very short. Therefore, desirably, upon generation of an overcurrent, the IGBTs 31 to 34 are insulated, and upon elimination of the overcurrent, the inverter circuit 1 is ready to immediately generate an alternating voltage.

In accordance with the inverter circuit 1 according to the embodiment of the present invention, the overcurrent protection function can be mounted as the peripheral circuit of the IC, while the output current of the pulse generator circuit 21 that is a general-purpose PWM IC is used to drive the photocouplers 41 to 44.

The output of the electric current detector 5 is inputted to the S-side input terminal of the flip-flop circuit 22 with no active device, such as an operational amplifier, interposed. Thus, the flip-flop circuit 22 can stop the operation of the IGBTs 31 to 34 in a quick response when an overcurrent occurs. The generation of an alternating voltage can be started from the first ON signal after the elimination of the overcurrent, and hence the operation is quickly returned to normal operation.

The pulse generator circuit 21 is configured so as to have down time for which all the IGBTs 31 to 34 do not operate. According to the configuration, when the input signal to the R-side input terminal is one, the possibility that the input signal to the S-side input terminal is turned to one can be reduced. That is, the configuration reduces the possibility that the flip-flop circuit 22 becomes unstable.

Note that in the description of the present invention, the X-ray radiation device using the X-ray tube as the load device is assumed. The technical idea of the present invention is not limited to the X-ray radiation device, and the technical idea is applicable to any device on which an overcurrent is possibly generated.

What is claimed is:

1. An inverter circuit comprising:
   a plurality of semiconductor switching elements constituting a bridge circuit;
   a transformer connected to an output end of the bridge circuit;
   an electric current detector configured to detect whether an electric current carried through at least one of the plurality of semiconductor switching elements exceeds a predetermined value;
   a pulse generator circuit configured to transmit a periodic pulse signal;
   a flip-flop circuit connected to the electric current detector and the pulse generator circuit, the flip-flop circuit being configured to invert an output signal by a detection signal of the electric current detector to interrupt an output of the bridge circuit;
   an electric current bypass switch in which a signal from an output terminal of the flip-flop circuit controls turning on or off the electric current bypass switch; and
   a gate signal generator circuit connected to the electric current bypass switch and the bridge circuit, the gate signal generator circuit being configured to switch the semiconductor switching element at a diagonal position of the bridge circuit based on a signal from the pulse generator circuit.

2. The inverter circuit according to claim 1, wherein the pulse generator circuit is composed of a switching regulator integrated circuit.

3. The inverter circuit according to claim 1, wherein the gate signal generator circuit has a plurality of photocouplers, and it is determined whether to supply an electric current necessary to turn on a semiconductor switching element to light emitting diodes of the photocouplers based on a signal from the electric current detector.

4. The inverter circuit according to claim 3, wherein the gate signal generator circuit controls an operation of the plurality of semiconductor switching elements based on an operation of the photocouplers.

5. The inverter circuit according to claim 3, wherein the photocouplers are connected to the electric current bypass switch in parallel.

6. The inverter circuit according to claim 3, wherein the photocouplers comprise four photocouplers, and two photocouplers are each connected in series.

7. The inverter circuit according to claim 1, wherein the flip-flop circuit is a reset-set (RS) flip-flop circuit having an S-side input terminal connected to the electric current detector and an R-side input terminal connected to the pulse generator circuit, and when the electric current detector detects an electric current exceeding a predetermined value, the output terminal of the flip-flop circuit turns on the electric current bypass switch, bypasses an electric current to the gate signal generator circuit by the electric current bypass switch, stops a signal output to the gate signal generator circuit, and latches the plurality of semiconductor switching elements to be turned off.

8. The inverter circuit according to claim 1, wherein the pulse generator circuit is connected to the electric current bypass switch, and the pulse generator circuit has a transistor between a connection end to the electric current bypass switch and a reference potential part.

9. The inverter circuit according to claim 8, wherein the flip-flop circuit is reset by a voltage from a control power supply, the voltage being applied to a collector of the transistor when the transistor is off.

10. The inverter circuit according to claim 1, further comprising:
    a rectifier configured to rectify a voltage of a secondary wire of the transformer;
    an output voltage detection circuit configured to detect an output voltage of the rectifier; and
    an error amplifier configured to compare the output voltage with a predetermined reference voltage to output a compared result, wherein the pulse generator circuit is modulated based on an output signal from the error amplifier.

11. The inverter circuit according to claim 1, wherein the electric current detector detects an electric current carried across the transformer and a semiconductor switching element.

12. An X-ray radiation device comprising:
an inverter circuit comprising:
- a plurality of semiconductor switching elements constituting a bridge circuit;
- a transformer connected to an output end of the bridge circuit;
- an electric current detector configured to detect whether an electric current carried through at least one of the plurality of semiconductor switching elements exceeds a predetermined value;
- a pulse generator circuit configured to transmit a periodic pulse signal;
- a flip-flop circuit connected to the electric current detector and the pulse generator circuit, the flip-flop circuit being configured to invert an output signal by a detection signal of the electric current detector to interrupt an output of the bridge circuit;
- an electric current bypass switch in which a signal from an output terminal of the flip-flop circuit controls turning on or off the electric current bypass switch;
- a gate signal generator circuit connected to the electric current bypass switch and the bridge circuit, the gate signal generator circuit being configured to switch the semiconductor switching element at a diagonal position of the bridge circuit based on a signal from the pulse generator circuit; and an X-ray tube connected to a secondary wire of the transformer.

* * * * *